(12) United States Patent
Han et al.

(10) Patent No.: US 10,169,280 B2
(45) Date of Patent: Jan. 1, 2019

(54) DATA PROCESSING APPARATUS AND TERMINAL

(71) Applicant: Huawei Technologies Co., Ltd., Shenzhen (CN)

(72) Inventors: Xinwei Han, Chengdu (CN); Xian Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 15/337,612

(22) Filed: Oct. 28, 2016

(65) Prior Publication Data

US 2017/0046296 A1 Feb. 16, 2017

Related U.S. Application Data

(63) Continuation of application No. PCT/CN2015/077777, filed on Apr. 29, 2015.

(30) Foreign Application Priority Data

Apr. 30, 2014 (CN) .......................... 2014 1 0181402

(51) Int. Cl.
*H04L 12/933* (2013.01)
*G06F 13/40* (2006.01)
*G06F 12/0811* (2016.01)

(52) U.S. Cl.
CPC ...... *G06F 13/4022* (2013.01); *G06F 12/0811* (2013.01); *H04L 49/103* (2013.01); *G06F 2212/283* (2013.01)

(58) Field of Classification Search
None
See application file for complete search history.

(56) References Cited

U.S. PATENT DOCUMENTS

| 5,440,752 | A | * | 8/1995 | Lentz | G06F 12/0813 |
| | | | | | 710/123 |
| 6,160,814 | A | * | 12/2000 | Ren | H04L 12/5601 |
| | | | | | 370/427 |
| 6,501,757 | B1 | | 12/2002 | Kamaraj et al. | |
| 7,555,593 | B1 | * | 6/2009 | Rosman | G06F 13/4054 |
| | | | | | 370/392 |

(Continued)

FOREIGN PATENT DOCUMENTS

| CN | 1495061 A | 5/2004 |
| CN | 102857446 A | 1/2013 |

(Continued)

*Primary Examiner* — Elias Mamo
(74) *Attorney, Agent, or Firm* — Slater Matsil, LLP

(57) ABSTRACT

Embodiments of the present invention disclose a data processing apparatus. Output ends of an input switching module in the apparatus are respectively connected to input ends of buffer units included in a buffer module; a control end of a write arbiter is connected to a control end of the input switching module. Input ends of an output switching module are respectively connected to output ends of the buffer units; Output ends of the output switching module are respectively connected to input ends of a rearranger; a control end of a read arbiter is connected to a control end of the output switching module; and output ends of the rearranger are respectively connected to output ends of the data processing apparatus.

10 Claims, 5 Drawing Sheets

(56) References Cited

U.S. PATENT DOCUMENTS

| | | | | |
|---|---|---|---|---|
| 8,359,417 B2 * | 1/2013 | Shuholm | ............... | G06F 13/12 710/1 |
| 2004/0059875 A1 | 3/2004 | Garg et al. | | |
| 2008/0279195 A1 | 11/2008 | Okuno | | |

FOREIGN PATENT DOCUMENTS

| CN | 103117962 A | 5/2013 |
|---|---|---|
| CN | 103955436 A | 7/2014 |
| WO | 2013033882 A1 | 3/2013 |

* cited by examiner

DATA PROCESSING APPARATUS AND TERMINAL

CROSS-REFERENCE TO RELATED APPLICATIONS

This application is a continuation of International Application No. PCT/CN2015/077777, filed on Apr. 29, 2015, which claims priority to Chinese Patent Application No. 201410181402.6, filed on Apr. 30, 2014. The disclosures of the aforementioned applications are hereby incorporated by reference in their entireties.

TECHNICAL FIELD

The present invention relates to the field of communications technologies, and in particular, to a data processing apparatus and a terminal.

BACKGROUND

Data storage and data exchange is a core technology for a communications device, and a current data storage and exchange process is as follows.

The communications device receives data by using an input end, then stores the data into an on-chip or off-chip data buffer, and during forwarding, first reads the data from the buffer, and then exchanges the data to a target output end for data outputting.

In addition, data received by each data input end in a current communications device is buffered into a buffer corresponding to the data input end. For example, the communications device includes an input end 1, an input end 2, an input end 3, . . . , and an input end n, and buffers include a buffer 1, a buffer 2, a buffer 3, . . . , and a buffer n; in this case, data received by the input end 1 is stored into the buffer 1, data received by the input end 2 is stored into the buffer 2, data received by the input end 3 is stored into the buffer 3, and data received by the input end n is stored into the buffer n. However, in an actual application, different input ends may receive different amounts of data; in this case, different buffers store different amounts of data, that is, occupation amounts of data spaces of different buffers are different. For example, data spaces of some buffers are all occupied, and consequently data received by input ends corresponding to the buffers cannot be stored; or for some buffers, few data spaces are occupied, which causes low data space utilization of the buffers. It may be learned that buffer utilization of a current communications device is not high.

SUMMARY

Embodiments provide a data processing apparatus and a terminal, which can resolve a problem that buffer utilization of a communications device is not high.

According to a first aspect, embodiments provide a data processing apparatus, including an input switching module, a buffer module, an output switching module, a write arbiter, a read arbiter, and a rearranger, where the buffer module includes N buffer units, and N is a positive integer greater than 1. The apparatus also includes a first input end to an $N^{th}$ input end of the input switching module are respectively connected to a first input end to an $N^{th}$ input end of the data processing apparatus, and a first output end to an $N^{th}$ output end of the input switching module are respectively corresponding to a first buffer unit to an $N^{th}$ buffer unit included in the buffer module. The apparatus also includes a first input end to an $N^{th}$ input end of the output switching module are respectively corresponding to the first buffer unit to the $N^{th}$ buffer unit, and a first output end to an $N^{th}$ output end of the output switching module are respectively connected to a first output end to an $N^{th}$ output end of the data processing apparatus.

In a first possible implementation manner of the first aspect, the input switching module is configured to acquire target data transmitted by a target input end of the data processing apparatus, where the target input end is one or more input ends of the data processing apparatus. The apparatus further includes: the write arbiter, where a control end of the write arbiter is connected to a control end of the input switching module, and the write arbiter is configured to control the input switching module to store the target data into a target buffer unit, where the target buffer unit is any one or more buffer units in the N buffer units. The apparatus also includes the read arbiter, where a control end of the read arbiter is connected to a control end of the output switching module, and the read arbiter is configured to control the output switching module to read the target data from the target buffer unit. The apparatus also includes the rearranger, where a first output end to an $N^{th}$ output end of the rearranger are respectively connected to the first output end to the $N^{th}$ output end of the data processing apparatus. The read arbiter is further configured to control the output switching module to transmit the target data to a target input end of the rearranger, where the target input end is an input end that is of the rearranger and that is used to transmit the data to a target output end of the rearranger, the target output end is an output end that is of the rearranger and that is connected to a destination port of the target data, and the destination end of the target data is one or more output ends of the data processing apparatus. The rearranger is configured to: when there are multiple pieces of data that are in a storage space of the rearranger and whose destination ports are the same as the destination port of the target data, sort the pieces of data whose destination ports are the same, and then output the pieces of data whose destination ports are the same to the destination port according to a result of the sorting.

With reference to the first possible implementation manner of the first aspect, in a second possible implementation manner of the first aspect, the apparatus further includes a buffer management module; a first end of the buffer management module is connected to an address output end of the read arbiter, and a second end of the buffer management module is connected to an address input end of the write arbiter; the write arbiter is configured to: acquire a target address of the target buffer unit from the buffer management module, and then control the input switching module to store the target data into the target address of the target buffer unit; and the read arbiter is configured to: control the output switching module to read the target data from the target address of the target buffer unit, send the target address to the buffer management module, and control the output switching module to transmit the target data to the target input end of the rearranger.

With reference to the second possible implementation manner of the first aspect, in a third possible implementation manner of the first aspect, the write arbiter is configured to: collect statistics on data storage statuses of all the buffer units in the buffer module, select, from the N buffer units according to the data storage statuses, one or more buffer units that have an idle storage space as the target buffer unit, and send, to the buffer management module, request information used to acquire an address of an idle storage space of the target buffer unit; the buffer management module is configured to send the target address of the target buffer unit to the write arbiter according to the request information, where the target address is the address of the idle storage space; and the write arbiter is further configured to: acquire the target address transmitted by the buffer management module, and control the input switching module to store the target data into the target address.

With reference to the third possible implementation manner of the first aspect, in a fourth possible implementation manner of the first aspect, a feedback receive end of the write arbiter is connected to a feedback end of the read arbiter; the read arbiter is configured to: control the output switching module to read the target data from the target address of the target buffer unit, send the target address to the buffer management module, control the output switching module to transmit the target data to the target input end of the rearranger, and feed back, to the write arbiter, feedback information indicating that the target data stored in the target address has already been read; and the write arbiter is further configured to update a data storage status of the target buffer unit according to the feedback information.

With reference to the third possible implementation manner of the first aspect, in a fifth possible implementation manner of the first aspect, the write arbiter is configured to: collect statistics on the data storage status of all the buffer units in the buffer module, select, from the N buffer units according to the target data storage statuses by using a load balance algorithm or a least load first algorithm, the one or more buffer units that have an idle storage space as the target buffer unit, and send, to the buffer management module, the request information used to acquire the address of the idle storage space of the target buffer unit.

With reference to the second possible implementation manner of the first aspect, in a sixth possible implementation manner of the first aspect, the apparatus further includes a queue management module; an input end of the queue management module is connected to an output end of the write arbiter, and an output end of the queue management module is connected to a first input end of the read arbiter; the queue management module is configured to: acquire data information transmitted by the write arbiter, where the data information includes a source port and a destination port of the target data and the target address, generate, based on the data information, a cell descriptor CD that includes the source port and the destination port of the target data and the target address, add the CD into a target output queue, and output the CD in the output queue to the read arbiter, where a source port of the target output queue is the source port of the target data, and a destination port of the target output queue is the destination port of the target data; and the read arbiter is configured to: acquire the CD transmitted by the queue management module, control, according to the CD, the output switching module to read the target data from the target address of the target buffer unit, send the target address to the buffer management module, and control the output switching module to transmit the target data to the target input end of the rearranger.

With reference to the sixth possible implementation manner of the first aspect, in a seventh possible implementation manner of the first aspect, a feedback end of the rearranger is connected to a feedback receive end of the read arbiter; when a data volume of buffer data that is stored in the storage space of the rearranger and whose destination port is the same as the destination port of the target data exceeds a preset threshold, and the buffer data does not include the target data whose input time is prior to an input time of the buffer data, the rearranger outputs, to the read arbiter, a request message used to acquire the target data; the read arbiter is configured to: acquire the CD transmitted by the queue management module, acquire the request message output by the rearranger, control, according to the request message and the CD, the output switching module to read the target data from the target address of the target buffer unit, send the target address to the buffer management module, and control the output switching module to transmit the target data to the target input end of the rearranger; and the rearranger is further configured to: sort the buffer data and the target data, and then output the pieces of data whose destination ports are the same to the destination port according to a result of the sorting.

With reference to the sixth possible implementation manner of the first aspect, in an eighth possible implementation manner of the first aspect, the queue management module is further configured to: allocate sequence numbers to pieces of data whose destination ports are the same, and output a sequence number of the target data to the read arbiter; the read arbiter is further configured to send the sequence number of the target data to the rearranger. The rearranger is further configured to: when there are multiple pieces of data that are in the storage space of the rearranger and whose destination ports are the same as the destination port of the target data, sort, according to the sequence numbers of the pieces of data whose destination ports are the same, the pieces of data whose destination ports are the same, and then output the pieces of data whose destination ports are the same to the destination port according to a result of the sorting.

With reference to the second possible implementation manner of the first aspect, in a ninth possible implementation manner of the first aspect, the first input end to the $N^{th}$ input end of the data processing apparatus are further respectively connected to a first input end to an $N^{th}$ input end of the write arbiter. The write arbiter is configured to acquire a write request that is used to request to write the target data into the buffer module and that is output by the target input end of the data processing apparatus, where the target input end of the data processing apparatus is one or more input ends in N input ends included in the data processing apparatus. The write arbiter is further configured to: acquire the target address of the target buffer unit from the buffer management module, control the input switching module to acquire the target data from the target input end of the data processing apparatus, and then control the input switching module to store the target data into the target address of the target buffer unit.

According to a second aspect, the present invention provides a terminal, where the terminal includes any data processing apparatus provided in the first aspect of the present invention.

In the foregoing technical solution, input ends of a data processing apparatus are corresponding to N buffer units in a buffer module by using an input switching module; in this way, the input switching module may store, in any one or more buffer units in the buffer module, data transmitted by the input ends of the data processing apparatus. In addition, an output switching module may further read, from a storage unit, data to be sent to an output end of the data processing apparatus. By comparison with the prior art in which data received by each data input end is buffered into a buffer corresponding to the data input end, the present invention can improve utilization of a buffer unit.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A data processing apparatus provided in the embodiments of the present invention may be applied to any device that has a data processing function, which is not limited in the embodiments of the present invention. For example, devices to which the data processing apparatus is applied include but are not limited to devices, such as a server, a base station, a base station controller, an access point device, a tablet computer, a mobile phone, an eReader, a remote control, a personal computer (Personal Computer, PC), a notebook computer, on-board equipment, a web television, and a wearable device, that have a data processing function.

Figure 1:
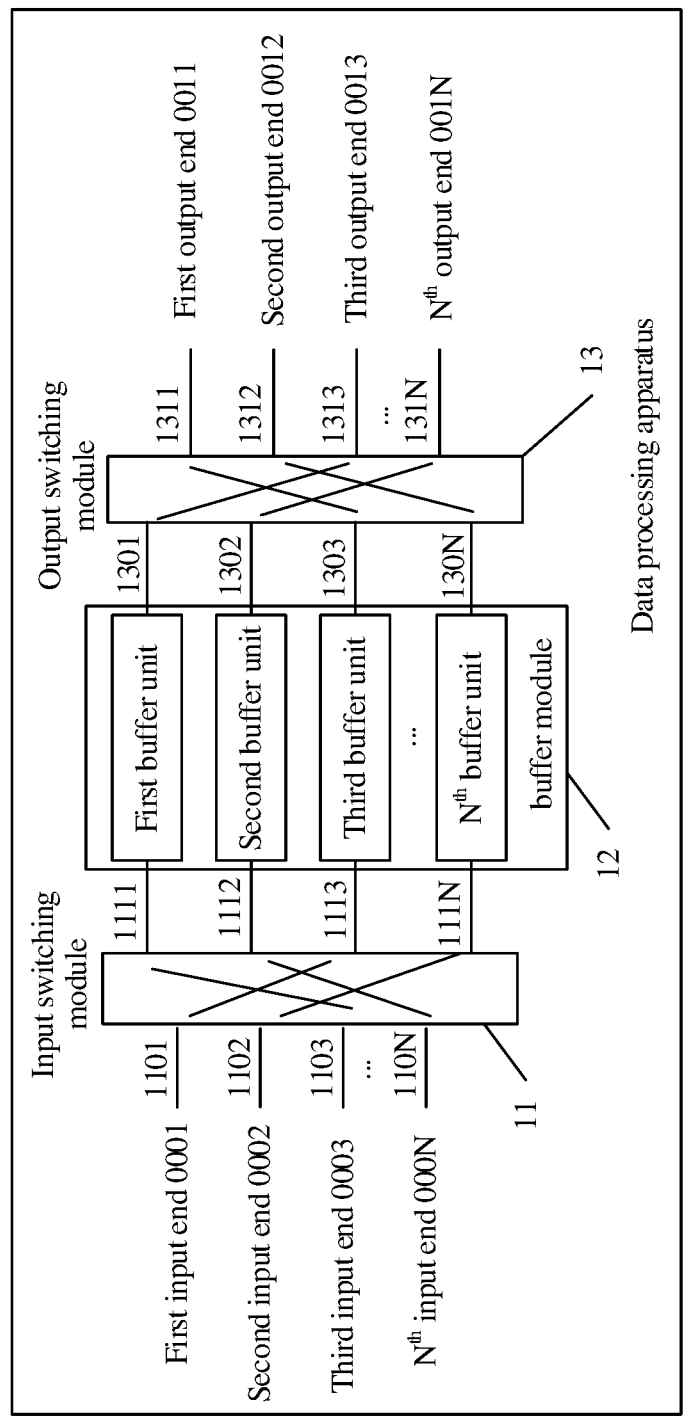
FIG. 1 is a schematic structural diagram of a data processing apparatus according to an embodiment of the present invention.

Referring to FIG. 1, FIG. 1 is a schematic structural diagram of a data processing apparatus according to an embodiment of the present invention. As shown in FIG. 1, the data processing apparatus includes an input switching module 11, a buffer module 12, and an output switching module 13, where the buffer module 12 includes N buffer units, and N is a positive integer greater than 1.

A first input end 1101 to an $N^{th}$ input end 110N of the input switching module 11 are respectively connected to a first input end 0001 to an $N^{th}$ input end 000N of the data processing apparatus, and a first output end 1111 to an $N^{th}$ output end 111N of the input switching module 11 are respectively corresponding to a first buffer unit to an $N^{th}$ buffer unit included in the buffer module 12.

A first input end 1301 to an $N^{th}$ input end 130N of the output switching module 13 are respectively corresponding to the first buffer unit to the $N^{th}$ buffer unit, and a first output end 1311 to an $N^{th}$ output end 131N of the output switching module 13 are respectively connected to a first output end 0011 to an $N^{th}$ output end 001N of the data processing apparatus.

It may be understood that, that an output end of the foregoing input switching module 11 is corresponding to a buffer unit means that the output end of the input switching module 11 may write data into the buffer unit corresponding to the output end, and that an input end of the output switching module 13 is corresponding to a buffer unit means that the input end of the output switching module 13 may read data from the buffer unit corresponding to the input end.

In addition, the output ends of the foregoing input switching module 11 and the input ends of the output switching module 13 may all be virtual ports.

In addition, when the foregoing buffer unit includes an input end and an output end, it may be understood that, that the first output end 1111 to the $N^{th}$ output end 111N of the input switching module 11 are respectively corresponding to the first buffer unit to the $N^{th}$ buffer unit included in the buffer module 12 means that the first output end 1111 to the $N^{th}$ output end 111N of the input switching module 11 are respectively connected to input ends of the first buffer unit to the $N^{th}$ buffer unit included in the buffer module 12, and that the first input end 1301 to the $N^{th}$ input end 130N of the output switching module 13 are respectively corresponding to the first buffer unit to the $N^{th}$ buffer unit means that the first input end 1301 to the $N^{th}$ input end 130N of the output switching module 13 are respectively connected to output ends of the first buffer unit to the $N^{th}$ buffer unit.

Optionally, the input switching module 11 may be an input cross-bar (IXBAR), where the IXBAR may include N selectors for 1-out-of-N selection (for example, 16 selectors for 1-out-of-16 selection). The output switching module 13 may be an output cross-bar (OXBAR), where the OXBAR may include N selectors for 1-out-of-N selection (for example, 16 selectors for 1-out-of-16 selection).

Optionally, the foregoing buffer unit may include a read-only memory (ROM) or a random access memory (RAM).

In the foregoing technical solution, input ends of a data processing apparatus are corresponding to N buffer units in a buffer module by using an input switching module; in this way, the input switching module may store, in any one or more buffer units in the buffer module, data transmitted by the input ends of the data processing apparatus. In addition, an output switching module may further read, from a storage unit, data to be sent to an output end of the data processing apparatus. By comparison with the prior art in which data received by each data input end is buffered into a buffer corresponding to the data input end, the present invention can improve utilization of a buffer unit.

Figure 2:
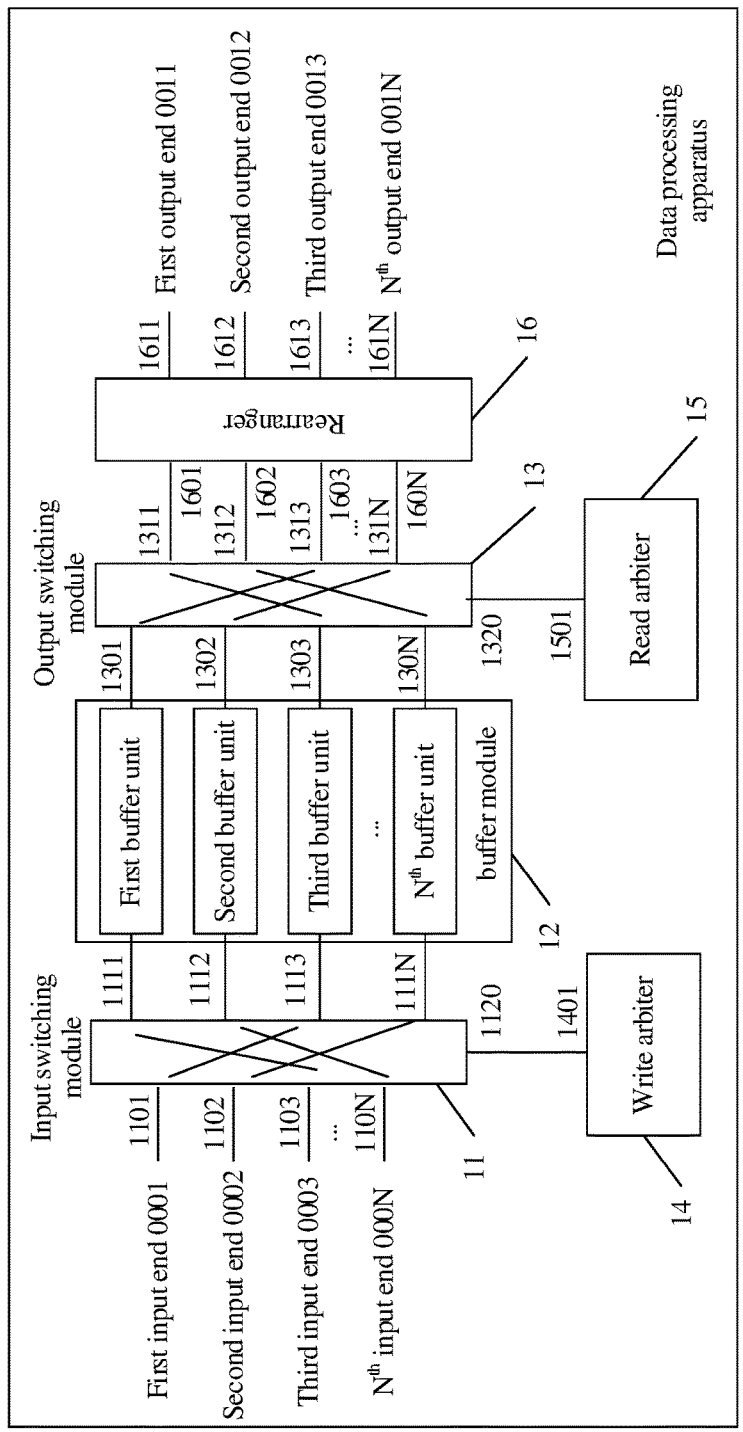
FIG. 2 is another schematic structural diagram of a data processing apparatus according to an embodiment of the present invention.

Optionally, as shown in FIG. 2, the apparatus may further include a write arbiter 14, a read arbiter 15, and a rearranger 16.

The input switching module 11 may be configured to acquire target data transmitted by a target input end of the data processing apparatus, where the target input end is one or more input ends of the data processing apparatus.

A control end 1401 of the write arbiter 14 is connected to a control end 1120 of the input switching module 11, and the write arbiter 14 may be configured to control the input switching module 11 to store the target data into a target buffer unit, where the target buffer unit is any one or more buffer units in the N buffer units.

A control end 1501 of the read arbiter 15 is connected to a control end 1320 of the output switching module 13, and the read arbiter 15 may be configured to control the output switching module 13 to read the target data from the target buffer unit.

The first output end 1311 to the N$^{th}$ output end 131N of the output switching module 13 are respectively connected to a first input end 1601 to an N$^{th}$ input end 160N of the rearranger 16.

A first output end 1611 to an N$^{th}$ output end 161N of the rearranger 16 are respectively connected to the first output end 0011 to the N$^{th}$ output end 001N of the data processing apparatus.

The read arbiter 15 may be further configured to control the output switching module 13 to transmit the target data to a target input end of the rearranger 16, where the target input end is an input end that is of the rearranger 16 and that is used to transmit the data to a target output end of the rearranger 16, the target output end is an output end that is of the rearranger 16 and that is connected to a destination port of the target data, and the destination end of the target data is one or more output ends of the target data processing apparatus.

The rearranger 16 may be configured to: when there are multiple pieces of data that are in a storage space of the rearranger 16 and whose destination ports are the same as the destination port of the target data, sort the pieces of data whose destination ports are the same, and then output the pieces of data whose destination ports are the same to the destination port according to a result of the sorting.

Certainly, the rearranger 16 may be further configured to output the target data to the destination port when there is one piece of data that is in the storage space of the rearranger 16 and whose destination port is the same as the destination port of the target data (for example, except the target data, there is no data whose destination port is the same as that of the target data, and the target data is one piece of data).

Optionally, each input end of the rearranger 16 may be corresponding to one storage space, and the storage space corresponding to the input end is further corresponding to an output end whose sequence number is the same as a sequence number of the input end. For example, the first input end 1601 is corresponding to a storage space 1, and a first output end 1611 is also corresponding to the storage space 1, that is, data received by the first input end 1601 is stored in the storage space 1, and then the first output end 1611 outputs the data in the storage space 1. The foregoing storage space may be a storage space. For ease of description, a storage space corresponding to an input end may be understood as a storage space of an output end whose sequence number is the same as a sequence number of the input end. In the foregoing manner, it can be implemented that data stored in each storage space is data to be sent to a same destination port.

In this embodiment, the foregoing target data may refer to one piece of data or multiple pieces of data. When the target data is one piece of data, the target input end of the foregoing data processing apparatus may be one input end, the foregoing target buffer unit may be one buffer unit, the target input end of the foregoing rearranger 16 may be one input end, and the target output end of the rearranger 16 may be one output end. In this case, as long as the storage space of the rearranger 16 (such as a buffer space) includes the target data and includes one or more other pieces of data whose destination ports are the same as the destination port of the target data, the rearranger 16 sorts theses pieces of data, and then outputs theses pieces of data to the destination port according to a result of the sorting. The sorting may be performed according to a first in first out principle, that is, data to be sent to a same destination port is output in a time order of buffering the data in a buffer unit.

In addition, when the foregoing target data is multiple pieces of data, the target input end of the foregoing data processing apparatus may be one input end or multiple input ends, for example, one input end inputs multiple pieces of data, or each of multiple input ends inputs one piece of data; the foregoing target buffer unit may be one buffer unit or multiple buffer units, for example, one buffer unit buffers multiple pieces of data, or each of multiple buffer units buffers one piece of data; the target input end of the foregoing rearranger 16 may be one input end or multiple input ends. For example, when destination ports of the multiple pieces of data included in the foregoing target data are the same, the rearranger 16 may sort the target data, and then output the target data according to a result of the sorting. Alternatively, when destination ports of the multiple pieces of data included in the foregoing target data are different, the rearranger 16 checks whether there is other data that is in the storage space of the rearranger 16 and whose destination port is the same as a destination port of data in the multiple pieces of data, and if there is such data, the rearranger 16 separately sorts data to be sent to different destination ports, and then outputs the data according to results of the sorting.

For example, the foregoing input switching module 11 receives, by using the first input end 1101, the target data transmitted by the first input end 0001 of the data processing apparatus, and the write arbiter 14 further controls the input switching module 11 to buffer the target data into a second buffer unit (for example, the second buffer unit stores the least data) in the buffer module 12, that is, the input switching module 11 outputs, from a second output end 1112 to the second buffer unit, the target data received by the first input end 1101. When the target data needs to be output, the read arbiter 15 may control a second input end 1302 of the output switching module 13 to read the target data from the second buffer unit. In addition, when the read arbiter 15 finds that the destination port of the target data is a third output end 0013 of the data processing apparatus, the read arbiter 15 may control the output switching module 13 to output the target data from a third output end 1413 to a third input end 1603 of the rearranger 16. When the storage space of the rearranger 16 further includes one or more other pieces of data whose destination ports are the third output end 0013 of the data processing apparatus, the rearranger 16 sorts the multiple pieces of data whose destination ports are the third output end 0013 of the data processing apparatus, and then transmits these pieces of data to the third output end 0013 of the data processing apparatus according to a result of the sorting.

For example, the foregoing input switching module 11 receives, by using the first input end 1101 and a second input end 1102 respectively, first data and second data that are transmitted by the first input end 0001 and a second input end 0002 of the data processing apparatus, and then the write arbiter 14 controls the input switching module 11 to buffer the first data and the second data into a third buffer unit and a fourth buffer unit (for example, the third buffer unit and the fourth buffer unit store the least data) in the buffer module 12 respectively, that is, the input switching module 11 outputs the first data and the second data from a third output end 1113 and a fourth output end 1114 to the third buffer unit and the fourth buffer unit respectively. When the first data and the second data need to be output, the read arbiter 15 may control a third input end 1303 of the output switching module 13 to read the first data from the third buffer unit and control a fourth input end 1304 of the output switching module 13 to read the second data from the fourth buffer unit. In addition, when the read arbiter 15 finds that a destination port of the first data is a fifth output end 0015 of the data processing apparatus and a destination port of the second data is a sixth output end 0016, the read arbiter 15 may control the output switching module 13 to output the first data from a fifth output end 1415 to a fifth input end 1605 of the rearranger 16 and output the second data from a sixth output end 1416 to a sixth input end 1606 of the rearranger 16. When a storage space corresponding to the fifth input end 1605 of the rearranger 16 includes multiple pieces of data, that is, when the storage space of the rearranger 16 includes multiple pieces of data whose destination ports are the fifth output end 0015 of the data processing apparatus, the rearranger 16 sorts the multiple pieces of data whose destination ports are the fifth output end 0015 of the data processing apparatus, and then transmits these pieces of data to the fifth output end 0015 of the data processing apparatus according to a result of the sorting. When a storage space corresponding to the sixth input end 1606 of the rearranger 16 includes multiple pieces of data, that is, when the storage space of the rearranger 16 includes multiple pieces of data whose destination ports are the sixth output end 0016 of the data processing apparatus, the rearranger 16 sorts the multiple pieces of data whose destination ports are the sixth output end 0016 of the data processing apparatus, and then transmits these pieces of data to the sixth output end 0016 of the data processing apparatus according to a result of the sorting.

It may be learned that in this embodiment, it can be implemented that multiple pieces of data are processed at the same time, that is, the multiple pieces of data are buffered at the same time, and the multiple pieces of data are exchanged and output at the same time, so that data processing efficiency is improved.

Figure 3:
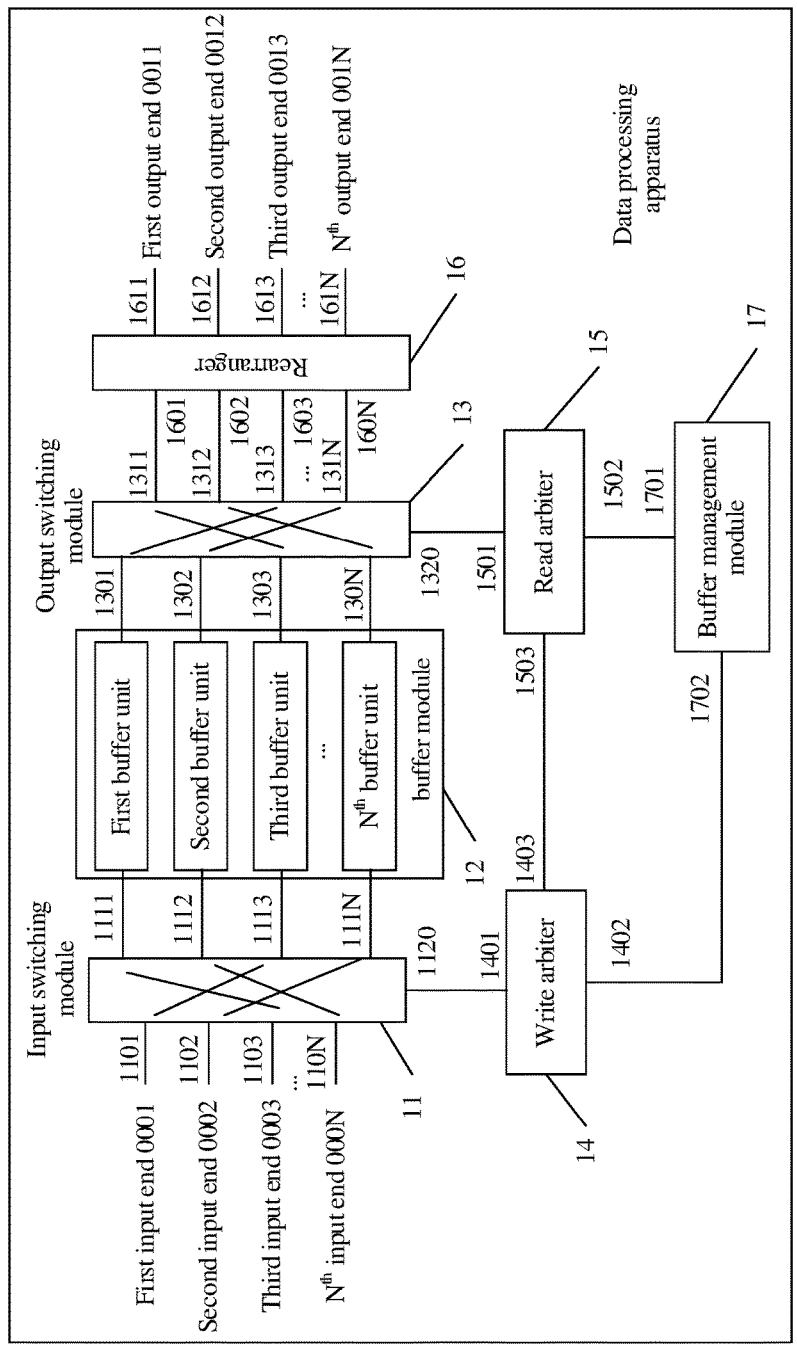
FIG. 3 is another schematic structural diagram of a data processing apparatus according to an embodiment of the present invention.

Optionally, as shown in FIG. 3, the data processing apparatus may further include a buffer management module 17.

A first end 1701 of the buffer management module 17 is connected to an address output end 1502 of the read arbiter 15, and a second end 1702 of the buffer management module 17 is connected to an address input end 1402 of the write arbiter 14.

The write arbiter 14 may be configured to: acquire a target address of the target buffer unit from the buffer management module 17, and then control the input switching module 11 to store the target data into the target address of the target buffer unit.

The read arbiter 15 may be configured to: control the output switching module 13 to read the target data from the target address of the target buffer unit, send the target address to the buffer management module 17, and control the output switching module 13 to transmit the target data to the target input end of the rearranger.

Optionally, when the buffer management module 17 receives the foregoing target address, the buffer management module 17 may determine that the data stored in the target address has already been read, and determine that a storage space in the target address is in an idle state.

In this implementation manner, it can be implemented that the buffer management module 17 independently manages addresses of all the buffer units in the buffer module 12. Data that the write arbiter 14 controls the input switching module 11 to input is all written into a storage space in an address acquired from the buffer management module 17, and after reading data from the buffer module 12, the read arbiter 15 sends, to the buffer management module 17, a storage address from which the data is read. In this way, the buffer management module 17 may know an address in which data is stored and an address in which no data is stored that are in each buffer unit in the buffer module 12, so as to implement management on an address of the buffer module 12.

Optionally, the write arbiter 14 may be configured to: collect statistics on data storage statuses of all the buffer units in the buffer module 12, select, from the N buffer units according to the data storage statuses, one or more buffer units that have an idle storage space as the target buffer unit, and send, to the buffer management module 17, request information used to acquire an address of an idle storage space of the target buffer unit.

The buffer management module 17 may be configured to send the target address of the target buffer unit to the write arbiter 14 according to the request information, where the target address is the address of the idle storage space.

The write arbiter 14 may be further configured to: acquire the target address transmitted by the buffer management module 17, and control the input switching module 11 to store the target data into the target address.

Optionally, the write arbiter 14 selects, from the N buffer units, the one or more buffer units that have an idle storage space as the target buffer unit, and then stores the target data into the target buffer unit. In this way, a case in which the target data is stored into a buffer unit that does not have an idle storage space can be avoided. In addition, the write arbiter 14 may further select, from the N buffer units in the buffer module 12 by using an algorithm such as a load balance algorithm or a least load first algorithm, the one or more buffer units as the target buffer unit. For example, the write arbiter 14 may be configured to: collect statistics on the data storage statuses of all the buffer units in the buffer module, and select, from the N buffer units according to the target data storage statuses by using the load balance algorithm or the least load first algorithm, the one or more buffer units that have an idle storage space as the target buffer unit, and send, to the buffer management module, the request information used to acquire the address of the idle storage space of the target buffer unit. Using the load balance algorithm or the least load first algorithm may be selecting, from the foregoing N buffer units, one buffer unit that stores the least amount of data as the foregoing target buffer unit, or selecting, from the N buffer units in descending order of amounts of stored data, the last one or more buffer units as the foregoing target buffer unit.

Optionally, the load balance algorithm used by the write arbiter 14 may include a round robin (round robin, RR) algorithm. A process of using the RR algorithm is as follows:

When receiving the target data, the input switching module 11 sets a pointer that points to a first buffer unit into which data is currently written. For example, if the pointer currently points to 3, and the foregoing target data includes data input by five input ends of the data processing apparatus at the same time, an actual write behavior is: data input by the first input end 0001 is written into a third buffer unit, data input by the second input end 0002 is written into a fourth buffer unit, and so on.

Optionally, a process of using the least load first method by the write arbiter 14 is as follows: Data stored in each buffer unit is counted, and then count values are sorted, where a smallest count value (that is, the least amount of stored data) has a highest priority. For example, if there are four buffer units whose count values are respectively 10, 20, 15, and 18, in descending order of allocated priorities, a sort order of the buffer units is: a first buffer unit, a third buffer unit, a fourth buffer unit, and a second buffer unit. In this case, if there is data input by two input ends of the data processing apparatus, data input by the former first input end is written into the first buffer unit, and data input by the second input end is written into the third buffer unit.

Certainly, when the write arbiter 14 selects the target buffer unit, an algorithm includes but is not limited to the two algorithms listed above, and the write arbiter 14 may also use another load sharing algorithm, which is not listed one by one herein.

Optionally, a feedback receive end 1403 of the write arbiter 14 is connected to a feedback end 1503 of the read arbiter 15.

The read arbiter 15 may be configured to: control the output switching module 13 to read the target data from the target address of the target buffer unit, send the target address to the buffer management module 17, control the output switching module 13 to transmit the target data to the target input end of the rearranger 16, and feed back, to the write arbiter 14, feedback information indicating that the target data stored in the target address has already been read.

The write arbiter 14 may be further configured to update a data storage status of the target buffer unit according to the feedback information.

In this implementation manner, it can be implemented that each time the read arbiter 15 controls the output switching module 13 to read one piece of data from the buffer module 12, the read arbiter 15 feeds back, to the write arbiter 14, that the data has been read; in this way, the write arbiter 14 may update the data storage statuses of all the buffer units in the buffer module 12 in a timely manner.

Figure 4:
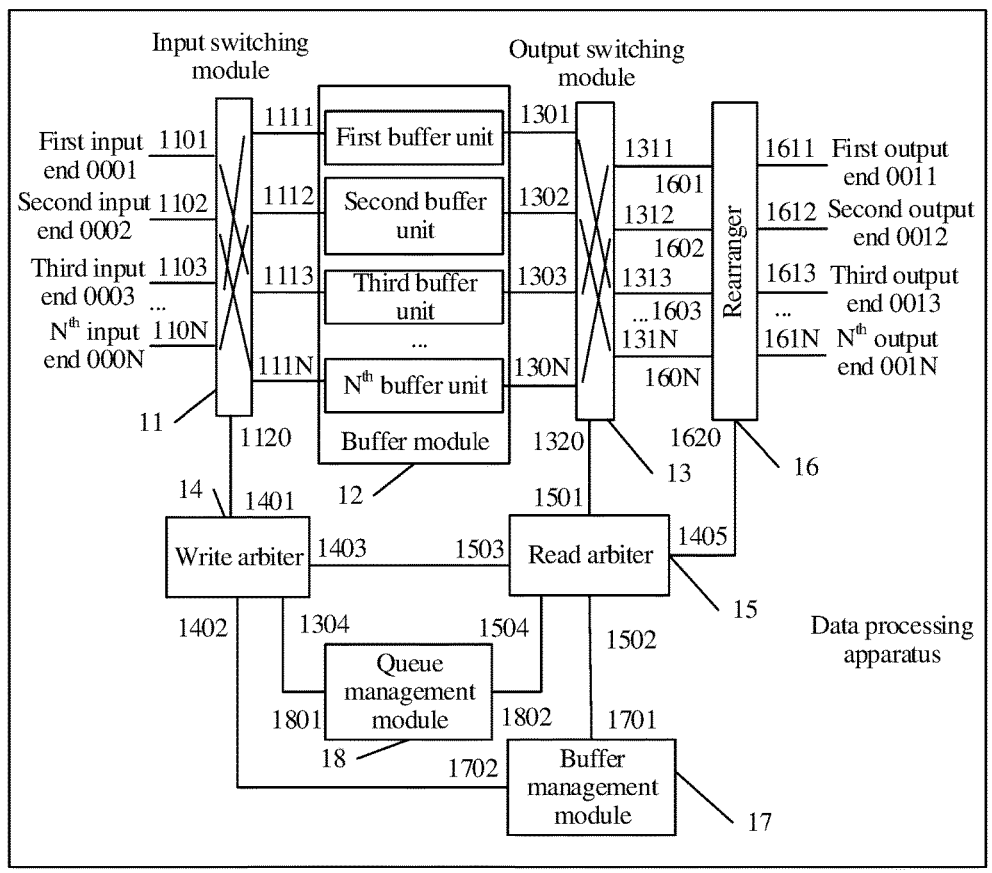
FIG. 4 is another schematic structural diagram of a data processing apparatus according to an embodiment of the present invention.

Optionally, as shown in FIG. 4, the apparatus further includes a queue management module 18.

An input end 1801 of the queue management module 18 is connected to an output end 1404 of the write arbiter 14, and an output end 1802 of the queue management module 18 is connected to a first input end 1504 of the read arbiter 15.

The queue management module 18 is configured to: acquire data information transmitted by the write arbiter 14, where the data information includes a source port and a destination port of the target data and the target address, generate, based on the data information, a cell descriptor CD that includes the source port and the destination port of the target data and the target address, add the CD into a target output queue, and output the CD in the output queue to the read arbiter 15, where a source port of the target output queue is the source port of the target data, and a destination port of the target output queue is the destination port of the target data.

The read arbiter 15 may be configured to: acquire the CD transmitted by the queue management module 18, control, according to the CD, the output switching module 13 to read the target data from the target address of the target buffer unit, send the target address to the buffer management module 17, and control the output switching module 14 to transmit the target data to the target input end of the rearranger 16.

Optionally, when the foregoing target data includes multiple pieces of data, the write arbiter 14 may send the foregoing data information for each piece of data; in this way, the queue management module 18 may generate a CD for each piece of data. For example, the foregoing target data includes first data input by the first input end 0001 of the data processing apparatus and second data input by the second input end 0002 of the data processing apparatus, where a destination port of the first data is the third output end 0013 of the data processing apparatus, and a destination port of the second data is a fourth output end 0014 of the data processing apparatus. The queue management module 18 may add a CD of the first data into a third output queue, where for the third queue, an input end is the first input end 0001 of the data processing apparatus, and a destination output end is the third output end 0013 of the data processing apparatus. The queue management module 18 may add a CD of the second data into a fourth output queue, where for the fourth queue, an input end is the second input end 0002 of the data processing apparatus, and a destination output end is the fourth output end 0014 of the data processing apparatus.

Optionally, an output queue managed by the queue management module 18 may be managed according to a first in first out principle. In addition, the queue management module 18 may include N×N output queues, for example, include an output queue whose source port is the first input end 0001 of the data processing apparatus and whose destination port is the first output end 0011 of the data processing apparatus, include an output queue whose source port is the first input end 0001 of the data processing apparatus and whose destination port is the $N^{th}$ output end 001N of the data processing apparatus, and include an output queue whose source port is the $N^{th}$ input end 000N of the data processing apparatus and whose destination port is the first output end 0011 of the data processing apparatus. That is, the queue management module 18 may include an output queue formed by any input end and any output end of the data processing apparatus, which is not listed one by one herein. Certainly, these queues may be preset, or may be output queues that are set when a first piece of data corresponding to any output queue arrives.

Optionally, a feedback end 1620 of the rearranger 16 is connected to a feedback receive end 1505 of the read arbiter 15. When a data volume of buffer data that is stored in the storage space of the rearranger 16 and whose destination port is the same as the destination port of the target data exceeds a preset threshold, and the buffer data does not include the target data whose input time is prior to an input time of the buffer data, the rearranger 16 may output, to the read arbiter 15, a request message used to acquire the target data.

The read arbiter 15 may be configured to: acquire the CD transmitted by the queue management module, acquire the request message output by the rearranger 16, control, according to the request message and the CD, the output switching module to read the target data from the target address of the target buffer unit, send the target address to the buffer management module 17, and control the output switching module 13 to transmit the target data to the target input end of the rearranger 16.

The rearranger 16 may be further configured to: sort the buffer data and the target data, and then output the pieces of data whose destination ports are the same to the destination port according to a result of the sorting.

Optionally, the foregoing buffer data that is stored in the storage space and whose destination port is the same as the destination port of the target data may be buffer data that is stored in a buffer space of the target output end of the rearranger 16 and whose destination port is the same as the destination port of the target data.

In this implementation manner, it can be implemented that when a disorder depth of the target output end of the rearranger 16 reaches the foregoing preset threshold, the target data whose input time is prior to an input time of data currently buffered at the target output end is preferentially read, so that it is ensured that the target output end of the rearranger 16 is not blocked. In addition, when the foregoing disorder depth is relatively low, the output switching module 13 may read multiple pieces of data to a buffer at an output end of the rearranger 16, so that it is ensured that read bandwidth is improved. It may be understood that the foregoing disorder means that data stored in the buffer at the output end of the rearranger 16 is not data that the output end currently needs to output, that is, the data that the output end of the rearranger 16 currently needs to output is not stored in the buffer at the output end. The following uses an instance for description.

The queue management module 18 may output multiple CDs to the read arbiter 15 at the same time, or output multiple CDs at different times. For example, the multiple CDs include a CD1, a CD2, a CD3, and a CD4, where first data corresponding to the CD1 is stored into the target buffer unit, target data corresponding to the CD2 is also stored into the target buffer unit, third data corresponding to the CD3 is stored into a first buffer unit, and fourth data corresponding to the CD4 is stored into the second buffer unit. In addition, CDs of the target data, the third data, and the fourth data belong to a same output queue, that is, source ports and destination ports of the target data, the third data and the fourth data are the same, and the CD2 is located before the CD3 and the CD4 in the output queue, that is, an input time of the target data is prior to an input time of the third data and an input time of the fourth data. In this way, when the read arbiter 15 receives the CD1, the CD2, the CD3 and the CD4 at the same time, the read arbiter 15 may first control the output switching module 13 to read the first data to the rearranger 16. The read arbiter 15 cannot control the output switching module 13 to read two pieces of data in a same buffer unit at the same time, that is, when the read arbiter 15 controls the output switching module 13 to read the first data, the read arbiter 16 cannot control the output switching module 13 to read the target data; therefore, the read arbiter 15 controls the output switching module 13 to read the third data and the fourth data. In this way, the third data and a fourth data are preferentially buffered into a buffer at the target output end of the rearranger 16. However, the rearranger 16 needs to perform outputting in a first in first out order, and the rearranger 16 cannot output the third data and the fourth data before receiving the target data, which, in this case, may be referred to as disorder. When the foregoing preset threshold is set to two pieces of data, the rearranger 16 may send, to the read arbiter 15, the request message for acquiring the target data, and the read arbiter 15 may control the output switching module 13 to preferentially read the target data.

Optionally, when an amount of buffer data stored in a buffer at the target output end of the rearranger 16 exceeds a preset threshold, and the buffer data does not include the target data that is stored in the buffer module 12, whose destination port is the target output end, and whose input time is the earliest, the rearranger 16 may output, to the read arbiter 15, a request message used to acquire the target data. In this implementation manner, it can be implemented that when a disorder depth of the target output end of the rearranger 16 reaches the foregoing preset threshold, data whose input time is the earliest is preferentially read, so that it is ensured that the target output end of the rearranger 16 is not blocked.

Optionally, the foregoing input time of data may refer to an acquiring time at which the input switching module 11 acquires the data, where the input time of the data may be represented by using a data sequence number. For example, data whose input time is earlier has a smaller sequence number; for example, a sequence number of data earliest input is 0, and a sequence number of data subsequently input is 1. In addition, a sequence number of data may be generated by the queue management module 17. Each time the input switching module 11 writes one piece of data into a storage unit, the input switching module 11 may send data information of the data to the queue management module 17; in this way, the queue management module 17 may generate a sequence number for the data according to an input time and a destination port of the data. In addition, when generating a sequence number for data, the queue management module 17 may differentiate between queues according to a destination port, that is, pieces of data whose destination ports are the same belong to one queue; and then generate, in an order of input times, a sequence number for data in each queue. In this way, it is implemented that a sequence number of each piece of data is used to indicate an output order of the data in a corresponding queue, so as to ensure first in first out. For example, the queue management module 17 may be further configured to: allocate sequence numbers to pieces of data whose destination ports are the same, and output a sequence number of the target data to the read arbiter 15.

The read arbiter 15 may be further configured to send the sequence number of the target data to the rearranger 16, which may be specifically sending the sequence number of the target data to the rearranger 16 by using the output switching module 13; for example, when the target data is sent to the rearranger 16, the target data carries the sequence number.

The rearranger 16 may be further configured to: when there are multiple pieces of data that are in the storage space of the rearranger 16 and whose destination ports are the same as the destination port of the target data, sort, according to the sequence numbers of the pieces of data whose destination ports are the same, the pieces of data whose destination ports are the same, and then output the pieces of data whose destination ports are the same to the destination port according to a result of the sorting.

In this implementation manner, it can be ensured that when data is to be output, a first in first out principle is used for outputting.

Optionally, the first input end 0001 to the $N^{th}$ input end 000N of the data processing apparatus are further respectively connected to a first input end 1351 to an $N^{th}$ input end 135N of the write arbiter 13.

The write arbiter 13 may be configured to acquire a write request that is used to request to write the target data into the buffer module 12 and that is output by the target input end of the data processing apparatus, where the target input end of the data processing apparatus is one or more input ends in N input ends included in the data processing apparatus.

The write arbiter 13 may be further configured to: acquire the target address of the target buffer unit from the buffer management module 17, control the input switching module 11 to acquire the target data from the target input end of the data processing apparatus, and then control the input switching module 11 to store the target data into the target address of the target buffer unit.

In this implementation manner, it can be implemented that a piece of data input each time is controlled by the write arbiter 13, and in this way, it can be ensured that data inputting is not out of order.

Optionally, this embodiment further provides a terminal, and the terminal may include the data processing apparatus in any implementation manner according to this embodiment of the present invention.

Figure 5:
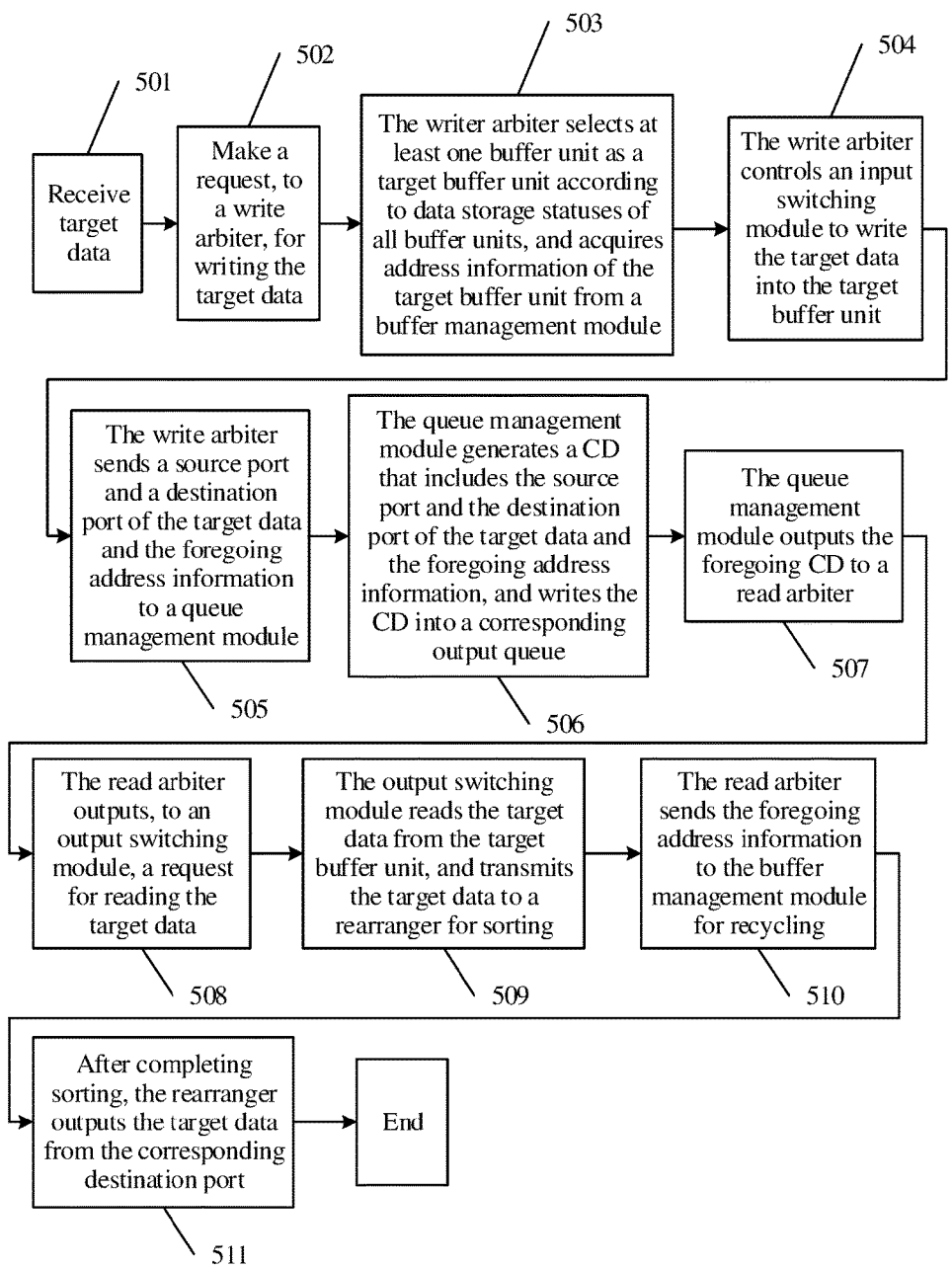
FIG. 5 is a schematic flowchart of a data processing method according to an embodiment of the present invention.

Referring to FIG. 5, FIG. 5 is a schematic flowchart of a data processing method according to an embodiment of the present invention. As shown in FIG. 5, the method includes:

501. Receive target data.

502. Make a request, to a write arbiter, for writing the target data.

503. The write arbiter selects at least one buffer unit as a target buffer unit according to data storage statuses of all buffer units, and acquires address information of the target buffer unit from a buffer management module.

504. The write arbiter controls an input switching module to write the target data into the target buffer unit.

505. The write arbiter sends a source port and a destination port of the target data and the foregoing address information to a queue management module.

506. The queue management module generates a CD that includes the source port and the destination port of the target data and the foregoing address information, and writes the CD into a corresponding output queue.

507. The queue management module outputs the foregoing CD to a read arbiter.

508. The read arbiter outputs, to an output switching module, a request for reading the target data.

509. The output switching module reads the target data from the target buffer unit, and transmits the target data to a rearranger for sorting.

510. The read arbiter sends the foregoing address information to the buffer management module for recycling.

511. After completing sorting, the rearranger outputs the target data from the corresponding destination port.

What are disclosed above are merely exemplary embodiments of the present invention, and certainly are not intended to limit the protection scope of the present invention. Therefore, equivalent variations made according to the claims of the present invention shall fall within the scope of the present invention.

What is claimed is:

1. An apparatus, comprising:
an input switching module;
a buffer module; and
an output switching module;
wherein the buffer module comprises N buffer units, and N is a positive integer greater than 1;
wherein a first input end to an $N^{th}$ input end of the input switching module are respectively connected to a first input end to an $N^{th}$ input end of the apparatus, and a first output end to an $N^{th}$ output end of the input switching module respectively correspond to a first buffer unit to an $N^{th}$ buffer unit comprised in the buffer module; and
wherein a first input end to an $N^{th}$ input end of the output switching module respectively correspond to the first buffer unit to the $N^{th}$ buffer unit, and a first output end to an $N^{th}$ output end of the output switching module are respectively connected to a first output end to an $N^{th}$ output end of the apparatus;
wherein the input switching module is configured to acquire target data transmitted by a target input end of the apparatus, wherein the target input end is one or more input ends of the apparatus;
wherein the apparatus further comprises a write arbiter, a read arbiter, and a rearranger;
wherein a control end of the write arbiter is connected to a control end of the input switching module, and the write arbiter is configured to control the input switching module to store the target data into a target buffer unit, wherein the target buffer unit is one or more buffer units of the N buffer units;
wherein a control end of the read arbiter is connected to a control end of the output switching module, and the read arbiter is configured to control the output switching module to read the target data from the target buffer unit;
wherein the first output end to the $N^{th}$ output end of the output switching module are respectively connected to a first input end to an $N^{th}$ input end of the rearranger;
wherein a first output end to an $N^{th}$ output end of the rearranger are respectively connected to the first output end to the $N^{th}$ output end of the apparatus;
wherein the read arbiter is further configured to control the output switching module to transmit the target data to a target input end of the rearranger, wherein the target input end is an input end of the rearranger that is used to transmit the data to a target output end of the rearranger, the target output end is an output end of the rearranger that is connected to a destination port of the target data, and a destination end of the target data is one or more output ends of the apparatus; and
wherein the rearranger is configured to, when there are a plurality of pieces of data that are in a storage space of the rearranger and whose destination ports are the same as the destination port of the target data, sort the plurality of pieces of data whose destination ports are the same, and then output the plurality of pieces of data whose destination ports are the same to the destination port according to a result of the sorting.

2. The apparatus according to claim 1, further comprising a buffer management module;
wherein a first end of the buffer management module is connected to an address output end of the read arbiter, and a second end of the buffer management module is connected to an address input end of the write arbiter;
wherein the write arbiter is configured to acquire a target address of the target buffer unit from the buffer management module, and control the input switching module to store the target data into the target address of the target buffer unit; and
wherein the read arbiter is configured to control the output switching module to read the target data from the target address of the target buffer unit, send the target address to the buffer management module, and control the output switching module to transmit the target data to the target input end of the rearranger.

3. The apparatus according to claim 2, wherein:
the write arbiter is configured to:
collect statistics on data storage statuses of all buffer units in the buffer module;
select, from the N buffer units according to the data storage statuses, one or more buffer units that have an idle storage space as the target buffer unit; and
send, to the buffer management module, request information for acquiring an address of an idle storage space of the target buffer unit;
wherein the buffer management module is configured to send the target address of the target buffer unit to the write arbiter according to the request information, wherein the target address is the address of the idle storage space; and
wherein the write arbiter is further configured to:
acquire the target address transmitted by the buffer management module, and control the input switching module to store the target data into the target address.

4. The apparatus according to claim 3, wherein a feedback receive end of the write arbiter is connected to a feedback end of the read arbiter;

wherein the read arbiter is configured to control the output switching module to read the target data from the target address of the target buffer unit, send the target address to the buffer management module, control the output switching module to transmit the target data to the target input end of the rearranger, and feed back, to the write arbiter, feedback information indicating that the target data stored in the target address has already been read; and wherein the write arbiter is further configured to update a data storage status of the target buffer unit according to the feedback information.

5. The apparatus according to claim 3, wherein the write arbiter is further configured to:
collect statistics on the data storage statuses of all the buffer units in the buffer module;
select, from the N buffer units according to the data storage statuses using a load balance algorithm or a least load first algorithm, the one or more buffer units that have an idle storage space as the target buffer unit; and
send, to the buffer management module, the request information for acquiring the address of the idle storage space of the target buffer unit.

6. The apparatus according to claim 2, wherein the apparatus further comprises a queue management module;
wherein an input end of the queue management module is connected to an output end of the write arbiter, and an output end of the queue management module is connected to a first input end of the read arbiter;
wherein the queue management module is configured to:
acquire data information transmitted by the write arbiter, wherein the data information comprises a source port and a destination port of the target data and the target address;
generate, based on the data information, a cell descriptor (CD) that comprises the source port and the destination port of the target data and the target address; and
add the CD into a target output queue, and output the CD in the target output queue to the read arbiter, wherein a source port of the target output queue is the source port of the target data, and a destination port of the target output queue is the destination port of the target data; and
wherein the read arbiter is further configured to:
acquire the CD transmitted by the queue management module;
control, according to the CD, the output switching module to read the target data from the target address of the target buffer unit; and
send the target address to the buffer management module, and control the output switching module to transmit the target data to the target input end of the rearranger.

7. The apparatus according to claim 6, wherein a feedback end of the rearranger is connected to a feedback receive end of the read arbiter;
wherein, when a data volume of buffer data that is stored in the storage space of the rearranger and whose destination port is the same as the destination port of the target data exceeds a preset threshold, and the buffer data does not comprise the target data whose input time is prior to an input time of the buffer data, the rearranger outputs, to the read arbiter, a request message used to acquire the target data;

wherein the read arbiter is configured to acquire the CD transmitted by the queue management module, acquire the request message output by the rearranger, control, according to the request message and the CD, the output switching module to read the target data from the target address of the target buffer unit, send the target address to the buffer management module, and control the output switching module to transmit the target data to the target input end of the rearranger; and
wherein the rearranger is further configured to sort the buffer data and the target data, and output the plurality of pieces of data whose destination ports are the same to the destination port according to a result of the sorting.

8. The apparatus according to claim 6, wherein the queue management module is further configured to allocate sequence numbers to pieces of data whose destination ports are the same, and output a sequence number of the target data to the read arbiter;
wherein the read arbiter is further configured to send the sequence number of the target data to the rearranger; and
wherein the rearranger is further configured to, when there are multiple pieces of data that are in the storage space of the rearranger and whose destination ports are the same as the destination port of the target data, sort, according to the sequence numbers of the pieces of data whose destination ports are the same, the pieces of data whose destination ports are the same, and then output the pieces of data whose destination ports are the same to the destination port according to a result of the sorting.

9. The apparatus according to claim 2, wherein the first input end to the $N^{th}$ input end of the apparatus are further respectively connected to a first input end to an $N^{th}$ input end of the write arbiter;
wherein the write arbiter is configured to:
acquire a write request for requesting to write the target data into the buffer module that is output by the target input end of the apparatus, wherein the target input end of the apparatus is one or more input ends in N input ends comprised in the apparatus; and
acquire the target address of the target buffer unit from the buffer management module, control the input switching module to acquire the target data from the target input end of the apparatus, and then control the input switching module to store the target data into the target address of the target buffer unit.

10. A terminal, comprising a data processing apparatus, wherein the data processing apparatus comprises:
an input switching module;
a buffer module; and
an output switching module;
wherein the buffer module comprises N buffer units, and N is a positive integer greater than 1;
wherein a first input end to an $N^{th}$ input end of the input switching module are respectively connected to a first input end to an $N^{th}$ input end of the data processing apparatus, and a first output end to an $N^{th}$ output end of the input switching module respectively correspond to a first buffer unit to an $N^{th}$ buffer unit comprised in the buffer module; and
wherein a first input end to an $N^{th}$ input end of the output switching module respectively correspond to the first buffer unit to the $N^{th}$ buffer unit, and a first output end to an $N^{th}$ output end of the output switching module are respectively connected to a first output end to an $N^{th}$ output end of the data processing apparatus;

wherein the input switching module is configured to acquire target data transmitted by a target input end of the apparatus, wherein the target input end is one or more input ends of the apparatus;

wherein the apparatus further comprises a write arbiter, a read arbiter, and a rearranger;

wherein a control end of the write arbiter is connected to a control end of the input switching module, and the write arbiter is configured to control the input switching module to store the target data into a target buffer unit, wherein the target buffer unit is one or more buffer units of the N buffer units;

wherein a control end of the read arbiter is connected to a control end of the output switching module, and the read arbiter is configured to control the output switching module to read the target data from the target buffer unit;

wherein the first output end to the $N^{th}$ output end of the output switching module are respectively connected to a first input end to an $N^{th}$ input end of the rearranger;

wherein a first output end to an $N^{th}$ output end of the rearranger are respectively connected to the first output end to the $N^{th}$ output end of the apparatus;

wherein the read arbiter is further configured to control the output switching module to transmit the target data to a target input end of the rearranger, wherein the target input end is an input end of the rearranger that is used to transmit the data to a target output end of the rearranger, the target output end is an output end of the rearranger that is connected to a destination port of the target data, and a destination end of the target data is one or more output ends of the apparatus; and wherein the rearranger is configured to, when there are a plurality of pieces of data that are in a storage space of the rearranger and whose destination ports are the same as the destination port of the target data, sort the plurality of pieces of data whose destination ports are the same, and then output the plurality of pieces of data whose destination ports are the same to the destination port according to a result of the sorting.

* * * * *